United States Patent
Jain et al.

(10) Patent No.: US 10,608,887 B2
(45) Date of Patent: Mar. 31, 2020

(54) USING PACKET TRACING TOOL TO AUTOMATICALLY EXECUTE PACKET CAPTURE OPERATIONS

(71) Applicant: Nicira, Inc., Palo Alto, CA (US)

(72) Inventors: Jayant Jain, Palo Alto, CA (US); Anirban Sengupta, Saratoga, CA (US); Subrahmanyam Manuguri, San Jose, CA (US); Rick Lund, Pleasanton, CA (US); Alok Tiagi, Palo Alto, CA (US)

(73) Assignee: NICIRA, INC., Palo Alto, CA (US)

( * ) Notice: Subject to any disclaimer, the term of this patent is extended or adjusted under 35 U.S.C. 154(b) by 16 days.

(21) Appl. No.: 15/726,789

(22) Filed: Oct. 6, 2017

(65) Prior Publication Data

US 2019/0109769 A1  Apr. 11, 2019

(51) Int. Cl.
| | |
|---|---|
| *H04L 12/24* | (2006.01) |
| *H04L 29/06* | (2006.01) |
| *H04L 12/26* | (2006.01) |
| *H04L 29/08* | (2006.01) |
| *H04L 12/931* | (2013.01) |

(52) U.S. Cl.
CPC ............. *H04L 41/12* (2013.01); *H04L 43/04* (2013.01); *H04L 43/12* (2013.01); *H04L 67/2814* (2013.01); *H04L 69/22* (2013.01); *H04L 41/0803* (2013.01); *H04L 41/22* (2013.01); *H04L 49/70* (2013.01)

(58) Field of Classification Search
CPC ......... H04L 41/12; H04L 43/04; H04L 69/22; H04L 49/70; H04L 41/0803; H04L 41/22
See application file for complete search history.

(56) References Cited

U.S. PATENT DOCUMENTS

| | | | |
|---|---|---|---|
| 5,224,100 | A | 6/1993 | Lee et al. |
| 5,245,609 | A | 9/1993 | Ofek et al. |
| 5,265,092 | A | 11/1993 | Soloway et al. |
| 5,504,921 | A | 4/1996 | Dev et al. |
| 5,550,816 | A | 8/1996 | Hardwick et al. |
| 5,729,685 | A | 3/1998 | Chatwani et al. |

(Continued)

FOREIGN PATENT DOCUMENTS

| | | |
|---|---|---|
| EP | 1154601 A1 | 11/2001 |
| EP | 3020169 A1 | 5/2016 |

(Continued)

OTHER PUBLICATIONS

Examination Report of commonly owned European Patent Application EP14730014.9, dated Mar. 3, 2017, 5 pages, European Patent Office.

(Continued)

*Primary Examiner* — Jackie Zuniga Abad
(74) *Attorney, Agent, or Firm* — Adeli LLP (57) ABSTRACT

Some embodiments provide a method that performs a packet tracing operation for a particular data flow between endpoints of a logical network to generate a representation of logical network components along a path between the endpoints. In response to a selection of at least two of the logical network components, the method automatically generates separate packet capture operations for execution by physical components that implement each of the selected logical network components. The method uses packet header information to correlate packet data from the separate packet capture operations.

21 Claims, 7 Drawing Sheets

(56) References Cited

U.S. PATENT DOCUMENTS

| | | |
|---|---|---|
| 5,751,967 A | 5/1998 | Raab et al. |
| 5,781,534 A | 7/1998 | Perlman et al. |
| 6,104,699 A | 8/2000 | Holender et al. |
| 6,104,700 A | 8/2000 | Haddock et al. |
| 6,141,738 A | 10/2000 | Munter et al. |
| 6,219,699 B1 | 4/2001 | McCloghrie et al. |
| 6,430,160 B1 | 8/2002 | Smith et al. |
| 6,456,624 B1 | 9/2002 | Eccles et al. |
| 6,512,745 B1 | 1/2003 | Abe et al. |
| 6,539,432 B1 | 3/2003 | Taguchi et al. |
| 6,658,002 B1 | 12/2003 | Ross et al. |
| 6,680,934 B1 | 1/2004 | Cain |
| 6,721,334 B1 | 4/2004 | Ketcham |
| 6,785,843 B1 | 8/2004 | McRae et al. |
| 6,941,487 B1 | 9/2005 | Balakrishnan |
| 6,963,585 B1 | 11/2005 | Le Pennec et al. |
| 6,999,454 B1 | 2/2006 | Crump |
| 7,013,342 B2 | 3/2006 | Riddle |
| 7,062,559 B2 | 6/2006 | Yoshimura et al. |
| 7,079,544 B2 | 7/2006 | Wakayama et al. |
| 7,180,856 B1 | 2/2007 | Breslau et al. |
| 7,197,572 B2 | 3/2007 | Matters et al. |
| 7,200,144 B2 | 4/2007 | Terrell et al. |
| 7,209,439 B2 | 4/2007 | Rawlins et al. |
| 7,243,143 B1 | 7/2007 | Bullard |
| 7,283,473 B2 | 10/2007 | Arndt et al. |
| 7,342,916 B2 | 3/2008 | Das et al. |
| 7,391,771 B2 | 6/2008 | Orava et al. |
| 7,450,598 B2 | 11/2008 | Chen et al. |
| 7,463,579 B2 | 12/2008 | Lapuh et al. |
| 7,478,173 B1 | 1/2009 | Delco |
| 7,483,370 B1 | 1/2009 | Dayal et al. |
| 7,555,002 B2 | 6/2009 | Arndt et al. |
| 7,577,131 B2 | 8/2009 | Joseph et al. |
| 7,590,133 B2 | 9/2009 | Hatae et al. |
| 7,602,723 B2 | 10/2009 | Mandato et al. |
| 7,606,260 B2 | 10/2009 | Oguchi et al. |
| 7,627,692 B2 | 12/2009 | Pessi |
| 7,633,955 B1 | 12/2009 | Saraiya et al. |
| 7,639,625 B2 | 12/2009 | Kaminsky et al. |
| 7,643,488 B2 | 1/2010 | Khanna et al. |
| 7,649,851 B2 | 1/2010 | Takashige et al. |
| 7,706,266 B2 | 4/2010 | Plamondon |
| 7,710,874 B2 | 5/2010 | Balakrishnan et al. |
| 7,729,245 B1 | 6/2010 | Breslau et al. |
| 7,760,735 B1 | 7/2010 | Chen et al. |
| 7,764,599 B2 | 7/2010 | Doi et al. |
| 7,792,987 B1 | 9/2010 | Vohra et al. |
| 7,802,000 B1 | 9/2010 | Huang et al. |
| 7,808,919 B2 | 10/2010 | Nadeau et al. |
| 7,808,929 B2 | 10/2010 | Wong et al. |
| 7,818,452 B2 | 10/2010 | Matthews et al. |
| 7,826,482 B1 | 11/2010 | Minei et al. |
| 7,839,847 B2 | 11/2010 | Nadeau et al. |
| 7,885,276 B1 | 2/2011 | Lin |
| 7,936,770 B1 | 5/2011 | Frattura et al. |
| 7,937,438 B1 | 5/2011 | Miller et al. |
| 7,937,492 B1 | 5/2011 | Kompella et al. |
| 7,948,986 B1 | 5/2011 | Ghosh et al. |
| 7,953,865 B1 | 5/2011 | Miller et al. |
| 7,991,859 B1 | 8/2011 | Miller et al. |
| 7,995,483 B1 | 8/2011 | Bayar et al. |
| 8,024,478 B2 | 9/2011 | Patel |
| 8,027,354 B1 | 9/2011 | Portolani et al. |
| 8,031,606 B2 | 10/2011 | Memon et al. |
| 8,031,633 B2 | 10/2011 | Bueno et al. |
| 8,046,456 B1 | 10/2011 | Miller et al. |
| 8,054,832 B1 | 11/2011 | Shukla et al. |
| 8,055,789 B2 | 11/2011 | Richardson et al. |
| 8,060,875 B1 | 11/2011 | Lambeth |
| 8,131,852 B1 | 3/2012 | Miller et al. |
| 8,149,737 B2 | 4/2012 | Metke et al. |
| 8,155,028 B2 | 4/2012 | Abu-Hamdeh et al. |
| 8,161,270 B1 | 4/2012 | Parker et al. |
| 8,166,201 B2 | 4/2012 | Richardson et al. |
| 8,199,750 B1 | 6/2012 | Schultz et al. |
| 8,223,668 B2 | 7/2012 | Allan et al. |
| 8,224,931 B1 | 7/2012 | Brandwine et al. |
| 8,224,971 B1 | 7/2012 | Miller et al. |
| 8,254,273 B2 | 8/2012 | Kaminsky et al. |
| 8,265,062 B2 | 9/2012 | Tang et al. |
| 8,265,075 B2 | 9/2012 | Pandey |
| 8,281,067 B2 | 10/2012 | Stolowitz |
| 8,290,137 B2 | 10/2012 | Yurchenko et al. |
| 8,306,043 B2 | 11/2012 | Breslau et al. |
| 8,312,129 B1 | 11/2012 | Miller et al. |
| 8,339,959 B1 | 12/2012 | Moisand et al. |
| 8,339,994 B2 | 12/2012 | Gnanasekaran et al. |
| 8,345,558 B2 | 1/2013 | Nicholson et al. |
| 8,351,418 B2 | 1/2013 | Zhao et al. |
| 8,359,576 B2 | 1/2013 | Prasad et al. |
| 8,456,984 B2 | 6/2013 | Ranganathan et al. |
| 8,504,718 B2 | 8/2013 | Wang et al. |
| 8,565,108 B1 | 10/2013 | Marshall et al. |
| 8,571,031 B2 | 10/2013 | Davies et al. |
| 8,611,351 B2 | 12/2013 | Gooch et al. |
| 8,612,627 B1 | 12/2013 | Brandwine |
| 8,625,594 B2 | 1/2014 | Safrai et al. |
| 8,625,603 B1 | 1/2014 | Ramakrishnan et al. |
| 8,625,616 B2 | 1/2014 | Vobbilisetty et al. |
| 8,644,188 B1 | 2/2014 | Brandwine et al. |
| 8,645,952 B2 | 2/2014 | Biswas et al. |
| 8,750,288 B2 | 6/2014 | Nakil et al. |
| 8,762,501 B2 | 6/2014 | Kempf et al. |
| 8,806,005 B2 | 8/2014 | Miri et al. |
| 8,837,300 B2 | 9/2014 | Nedeltchev et al. |
| 8,838,743 B2 | 9/2014 | Lewites et al. |
| 8,929,221 B2 | 1/2015 | Breslau et al. |
| 9,059,926 B2 | 6/2015 | Akhter et al. |
| 9,197,529 B2 | 11/2015 | Ganichev et al. |
| 9,226,220 B2 | 12/2015 | Banks et al. |
| 9,280,448 B2 | 3/2016 | Farrell et al. |
| 9,282,019 B2 | 3/2016 | Ganichev et al. |
| 9,344,349 B2 | 5/2016 | Ganichev et al. |
| 9,407,580 B2 | 8/2016 | Ganichev et al. |
| 9,602,334 B2 | 3/2017 | Benny |
| 9,860,151 B2 | 1/2018 | Ganichev et al. |
| 9,898,317 B2 | 2/2018 | Nakil et al. |
| 10,044,581 B1 | 8/2018 | Russell |
| 10,181,993 B2 | 1/2019 | Ganichev et al. |
| 10,200,306 B2 | 2/2019 | Nhu et al. |
| 2001/0020266 A1 | 9/2001 | Kojima et al. |
| 2001/0043614 A1 | 11/2001 | Viswanadham et al. |
| 2002/0093952 A1 | 7/2002 | Gonda |
| 2002/0194369 A1 | 12/2002 | Rawlins et al. |
| 2003/0041170 A1 | 2/2003 | Suzuki |
| 2003/0058850 A1 | 3/2003 | Rangarajan et al. |
| 2004/0073659 A1 | 4/2004 | Rajsic et al. |
| 2004/0098505 A1 | 5/2004 | Clemmensen |
| 2004/0186914 A1 | 9/2004 | Shimada |
| 2004/0267866 A1 | 12/2004 | Carollo et al. |
| 2004/0267897 A1 | 12/2004 | Hill et al. |
| 2005/0018669 A1 | 1/2005 | Arndt et al. |
| 2005/0027881 A1 | 2/2005 | Figueira et al. |
| 2005/0053079 A1 | 3/2005 | Havala |
| 2005/0083953 A1 | 4/2005 | May |
| 2005/0111445 A1 | 5/2005 | Wybenga et al. |
| 2005/0120160 A1 | 6/2005 | Plouffe et al. |
| 2005/0132044 A1 | 6/2005 | Guingo et al. |
| 2005/0182853 A1 | 8/2005 | Lewites et al. |
| 2005/0220096 A1 | 10/2005 | Friskney et al. |
| 2005/0232230 A1 | 10/2005 | Nagami et al. |
| 2006/0002370 A1 | 1/2006 | Rabie et al. |
| 2006/0026225 A1 | 2/2006 | Canali et al. |
| 2006/0028999 A1 | 2/2006 | Iakobashvili et al. |
| 2006/0029056 A1 | 2/2006 | Perera et al. |
| 2006/0037075 A1 | 2/2006 | Frattura et al. |
| 2006/0174087 A1 | 8/2006 | Hashimoto et al. |
| 2006/0187908 A1 | 8/2006 | Shimozono et al. |
| 2006/0193266 A1 | 8/2006 | Siddha et al. |
| 2006/0206655 A1 | 9/2006 | Chappell et al. |
| 2006/0218447 A1 | 9/2006 | Garcia et al. |
| 2006/0221961 A1 | 10/2006 | Basso et al. |
| 2006/0282895 A1 | 12/2006 | Rentzis et al. |

(56) References Cited

U.S. PATENT DOCUMENTS

| | | |
|---|---|---|
| 2006/0291388 A1 | 12/2006 | Amdahl et al. |
| 2007/0050763 A1 | 3/2007 | Kagan et al. |
| 2007/0055789 A1 | 3/2007 | Claise et al. |
| 2007/0064673 A1 | 3/2007 | Bhandaru et al. |
| 2007/0097982 A1 | 5/2007 | Wen et al. |
| 2007/0156919 A1 | 7/2007 | Potti et al. |
| 2007/0260721 A1 | 11/2007 | Bose et al. |
| 2007/0286185 A1 | 12/2007 | Eriksson et al. |
| 2007/0297428 A1 | 12/2007 | Bose et al. |
| 2008/0002579 A1 | 1/2008 | Lindholm et al. |
| 2008/0002683 A1 | 1/2008 | Droux et al. |
| 2008/0049614 A1 | 2/2008 | Briscoe et al. |
| 2008/0049621 A1 | 2/2008 | McGuire et al. |
| 2008/0049786 A1 | 2/2008 | Ram et al. |
| 2008/0059556 A1 | 3/2008 | Greenspan et al. |
| 2008/0071900 A1 | 3/2008 | Hecker et al. |
| 2008/0086726 A1 | 4/2008 | Griffith et al. |
| 2008/0112551 A1 | 5/2008 | Forbes et al. |
| 2008/0159301 A1 | 7/2008 | De Heer |
| 2008/0240095 A1 | 10/2008 | Basturk |
| 2009/0010254 A1 | 1/2009 | Shimada |
| 2009/0100298 A1 | 4/2009 | Lange et al. |
| 2009/0109973 A1 | 4/2009 | Ilnicki |
| 2009/0150527 A1 | 6/2009 | Tripathi et al. |
| 2009/0292858 A1 | 11/2009 | Lambeth et al. |
| 2010/0128623 A1 | 5/2010 | Dunn et al. |
| 2010/0131636 A1 | 5/2010 | Suri et al. |
| 2010/0188976 A1 | 7/2010 | Rahman et al. |
| 2010/0214949 A1 | 8/2010 | Smith et al. |
| 2010/0232435 A1 | 9/2010 | Jabr et al. |
| 2010/0254385 A1 | 10/2010 | Sharma et al. |
| 2010/0275199 A1 | 10/2010 | Smith et al. |
| 2010/0306408 A1 | 12/2010 | Greenberg et al. |
| 2011/0022695 A1 | 1/2011 | Dalal et al. |
| 2011/0075664 A1 | 3/2011 | Lambeth et al. |
| 2011/0085557 A1 | 4/2011 | Gnanasekaran et al. |
| 2011/0085559 A1 | 4/2011 | Chung et al. |
| 2011/0085563 A1 | 4/2011 | Kotha et al. |
| 2011/0128959 A1 | 6/2011 | Bando et al. |
| 2011/0137602 A1 | 6/2011 | Desineni et al. |
| 2011/0194567 A1 | 8/2011 | Shen |
| 2011/0202920 A1 | 8/2011 | Takase |
| 2011/0261825 A1 | 10/2011 | Ichino |
| 2011/0299413 A1 | 12/2011 | Chatwani et al. |
| 2011/0299534 A1 | 12/2011 | Koganti et al. |
| 2011/0299537 A1 | 12/2011 | Saraiya et al. |
| 2011/0305167 A1 | 12/2011 | Koide |
| 2011/0317559 A1 | 12/2011 | Kern et al. |
| 2011/0317696 A1 | 12/2011 | Aldrin et al. |
| 2012/0079478 A1 | 3/2012 | Galles et al. |
| 2012/0159454 A1 | 6/2012 | Barham et al. |
| 2012/0182992 A1 | 7/2012 | Cowart et al. |
| 2012/0275331 A1 | 11/2012 | Benkö et al. |
| 2012/0287791 A1 | 11/2012 | Xi et al. |
| 2013/0024579 A1 | 1/2013 | Zhang et al. |
| 2013/0031233 A1 | 1/2013 | Feng et al. |
| 2013/0041934 A1 | 2/2013 | Annamalaisami et al. |
| 2013/0044636 A1 | 2/2013 | Koponen et al. |
| 2013/0054761 A1 | 2/2013 | Kempf et al. |
| 2013/0058346 A1 | 3/2013 | Sridharan et al. |
| 2013/0067067 A1 | 3/2013 | Miri et al. |
| 2013/0125120 A1 | 5/2013 | Zhang et al. |
| 2013/0163427 A1 | 6/2013 | Beliveau et al. |
| 2013/0163475 A1 | 6/2013 | Beliveau et al. |
| 2013/0332602 A1 | 12/2013 | Nakil et al. |
| 2013/0332983 A1 | 12/2013 | Koorevaar et al. |
| 2013/0339544 A1 | 12/2013 | Mithyantha |
| 2014/0019639 A1 | 1/2014 | Ueno |
| 2014/0029451 A1 | 1/2014 | Nguyen |
| 2014/0115578 A1 | 4/2014 | Cooper et al. |
| 2014/0119203 A1 | 5/2014 | Sundaram et al. |
| 2014/0126418 A1 | 5/2014 | Brendel et al. |
| 2014/0157405 A1 | 6/2014 | Joll et al. |
| 2014/0177633 A1 | 6/2014 | Manula et al. |
| 2014/0195666 A1 | 7/2014 | Dumitriu et al. |
| 2014/0207926 A1 | 7/2014 | Benny |
| 2014/0219086 A1 | 8/2014 | Cantu' et al. |
| 2014/0281030 A1 | 9/2014 | Cui et al. |
| 2014/0282823 A1 | 9/2014 | Rash et al. |
| 2014/0304393 A1 | 10/2014 | Annamalaisami et al. |
| 2015/0016286 A1 | 1/2015 | Ganichev et al. |
| 2015/0016287 A1 | 1/2015 | Ganichev et al. |
| 2015/0016298 A1 | 1/2015 | Ganichev et al. |
| 2015/0016469 A1 | 1/2015 | Ganichev et al. |
| 2015/0180755 A1 | 6/2015 | Zhang et al. |
| 2015/0281036 A1 | 10/2015 | Sun et al. |
| 2016/0105333 A1 | 4/2016 | Lenglet et al. |
| 2016/0149791 A1 | 5/2016 | Ganichev et al. |
| 2016/0226741 A1 | 8/2016 | Ganichev et al. |
| 2017/0358111 A1 | 12/2017 | Madsen |
| 2018/0102959 A1 | 4/2018 | Ganichev et al. |
| 2018/0262447 A1 | 9/2018 | Nhu et al. |
| 2018/0262594 A1 | 9/2018 | Nhu et al. |

FOREIGN PATENT DOCUMENTS

| | | |
|---|---|---|
| JP | 2002141905 A | 5/2002 |
| JP | 2003069609 A | 3/2003 |
| JP | 2003124976 A | 4/2003 |
| JP | 2003318949 A | 11/2003 |
| WO | 9506989 A1 | 3/1995 |
| WO | 2012126488 A1 | 9/2012 |
| WO | 2013184846 A1 | 12/2013 |
| WO | 2015005968 A1 | 1/2015 |

OTHER PUBLICATIONS

Non-Published Commonly Owned U.S. Appl. No. 15/588,746, filed May 8, 2017, 54 pages, Nicira, Inc.

Non-Published Commonly Owned U.S. Appl. No. 15/588,727, filed May 8, 2017, 56 pages, Nicira, Inc.

PCT International Search Report and Written Opinion dated Sep. 22, 2014 for commonly owned International Patent Application PCT/US/14036464, 13 pages, Nicira, Inc.

Phan, Doantam, et al., "Visual Analysis of Network Flow Data with Timelines and Event Plots," month unknown, 2007, 16 pages, VizSEC.

Phaal, Peter, et al., "sFlow Version 5," Jul. 2004, 46 pages, available at http://www.sflow.org/sflow_version_5.txt.

USING PACKET TRACING TOOL TO AUTOMATICALLY EXECUTE PACKET CAPTURE OPERATIONS

BACKGROUND

Packet capture operations are a valuable tool in network troubleshooting. Using tcpdump or another tool, a network administrator can view the packets passing through a specific network location. However, in datacenters with multiple logical networks, much of the packet processing takes place in various components within the hypervisors, which perform packet processing operations for numerous isolated logical networks. An administrator of one logical network should be able to access packet data for other logical networks.

Furthermore, if administrators want to capture packet data at multiple locations within the network, they are typically required to manually access these components and initiate the packet captures at the various locations. This not only requires excess work, but also requires the administrator to have direct access to these components.

BRIEF SUMMARY

Some embodiments provide a method that enables automatic execution of packet capture operations at multiple points within a logical network datapath. In some embodiments, a user (e.g., a network administrator) initiates a packet tracing operation to identify logical and physical paths between specified source and destination logical network endpoints using a network management tool. The result of the packet tracing operation is a visualization of the logical network path between the endpoints, through various logical network components (e.g., logical switches, logical routers including centralized and distributed routing components, distributed firewall services, etc.), as well as the physical components that implement these logical network components in some embodiments. Via this visualization, the administrator selects one or more logical network components at which to initiate packet capture operations, and the network management tool initiates these operations (at the physical components implementing the logical network components) for the specific data flow between the endpoints of the packet tracing operation. In some embodiments, the network management tool uses the packet data from these multiple separate packet capture operations to correlate the packet capture operations and provide data about the data flow in the logical network.

As mentioned, in some embodiments the network administrator uses a network management tool to initiate the packet tracing operation and the packet capture operations. In some embodiments, the network management tool interacts with an application programming interface (API) of a network management and control system that controls the physical components implementing the logical network. This network management and control system, in some embodiments, executes the packet tracing operation by inserting a trace packet at a first-hop managed forwarding element (MFE) as though the packet was received by the MFE from the source endpoint, receives observation messages from the physical components that process the trace packet indicating various logical and physical network operations the physical components perform on the trace packet, accumulates the results of the packet tracing operation, and provides a visualization of the path to the network management tool. In addition, in some embodiments, the network management and control system executes the packet capture operations by issuing the packet capture commands to the physical components, receiving the results of the packet capture operations, and providing this data to the network management tool. In some embodiments, the network management and control system also correlates the multiple separate packet capture operations to match up individual packet data captured by each of the operations.

The administrator selects one or more of the logical network components at which to execute the packet capture operations (e.g., via the visualization of the path generated as a result of the packet tracing operation). In addition to the logical forwarding elements (e.g., logical switches, logical routers) and logical services (e.g., distributed firewalls, distributed load balancers), in some embodiments the user can select specific points such as logical ingress or egress ports of the logical forwarding elements, before or after tunnel encapsulation between physical endpoints, etc.

With the logical network packet capture points selected, the network management control system, in some embodiments identifies (i) the physical network components to execute the packet capture operations and (ii) the specific packet capture commands to issue to these physical network components. The network management and control system then issues these commands (e.g., tcpdump commands) to the physical network components, which execute the captures. The physical network components, in some embodiments, can include the various modules within virtualization software, such as the virtual switch, distributed virtual router module, virtual tunnel endpoint, specific filters in the chain between a virtual network interface controller (VNIC) and the virtual switch, the VNIC itself, etc.

In some embodiments, the packet capture commands are flow-specific—that is, the commands should limit the captured packets to only those belonging to the data flow(s) between the two endpoints. This limits the number of packets captured, makes correlation between the various packet captures easier, and ensures that a logical network administrator will not be provided access to packets for other logical networks.

The network management and control system also, in some embodiments, correlates the packet capture data. Typically, the packet capture data will include timestamps for each packet captured as well as various network layer (e.g., IP) and transport layer (e.g., TCP) fields (possibly also including data link layer (e.g., Ethernet) fields). Some embodiments use the packet header values (e.g., the packet identifier field of the IP header, TCP sequence numbers, etc.) to identify the same packet across the multiple sets of capture data. This enables the network management tool to provide the user with per-packet data identifying whether the packet reached each particular capture point, the time between each pair of capture points for the packet, the packet header field values at each capture point, etc. In some embodiments, the network management and control system performs additional analysis, such as average latency calculations between two capture points, identifying whether (and how many) packets are being dropped between two capture points, etc.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method that enables automatic execution of packet capture operations at multiple points within a logical network datapath. In some embodiments, a user (e.g., a network administrator) initiates a packet tracing operation to identify logical and physical paths between specified source and destination logical network endpoints using a network management tool. The result of the packet tracing operation is a visualization of the logical network path between the endpoints, through various logical network components (e.g., logical switches, logical routers including centralized and distributed routing components, distributed firewall services, etc.), as well as the physical components that implement these logical network components in some embodiments. Via this visualization, the administrator selects one or more logical network components at which to initiate packet capture operations, and the network management tool initiates these operations (at the physical components implementing the logical network components) for the specific data flow between the endpoints of the packet tracing operation. In some embodiments, the network management tool uses the packet data from these multiple separate packet capture operations to correlate the packet capture operations and provide data about the data flow in the logical network.

Figure 1:
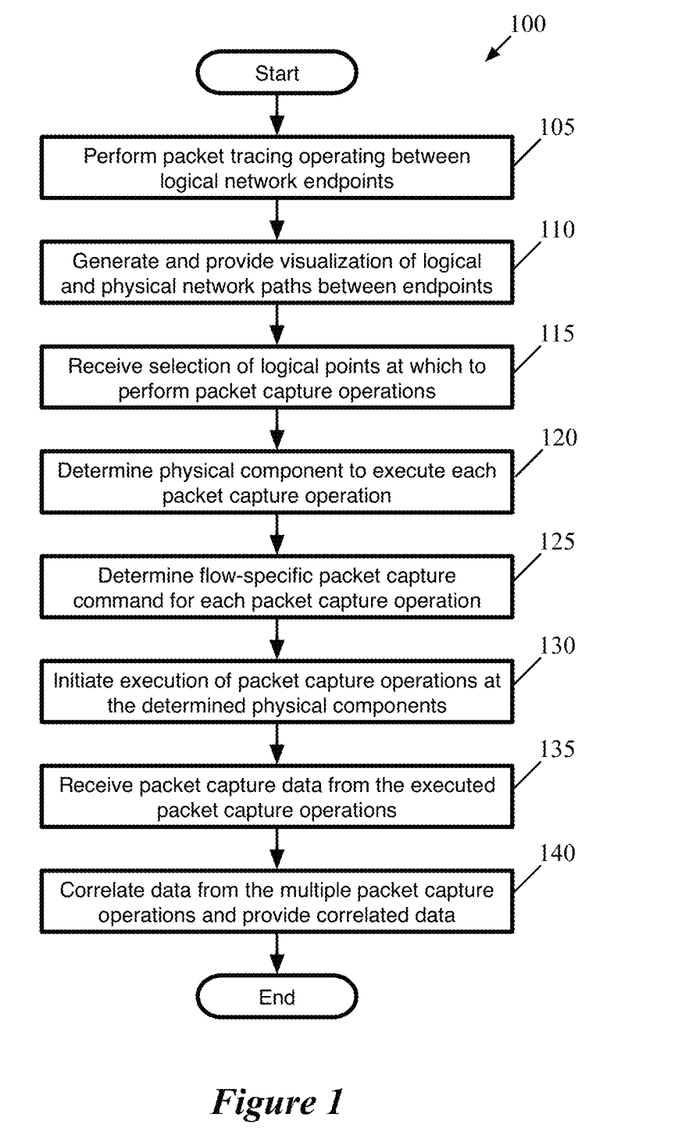
FIG. 1 conceptually illustrates a process 100 of some embodiments for initiating and correlating multiple packet captures.

FIG. 1 conceptually illustrates a process 100 of some embodiments for initiating and correlating multiple packet captures. In some embodiments, the process 100 is performed by a network management and control system that manages the physical components implementing the logical network. The network management and control system of some embodiments includes a management plane with which a user interacts (e.g., via the GUI of a network management tool) and which generates configuration data for the physical components based on logical network configurations received via its application programming interface (API) from the network management tool. The network management and control system of some embodiments also includes a set of central controllers and local controllers that distribute this configuration data and provide the management plane with current physical network information. The network management and control system will be described in further detail below by reference to FIG. 6.

As shown, the process 100 begins (at 105) by performing a packet tracing operation between logical network endpoints. In some embodiments, a user (e.g., a logical network administrator) uses a network management tool to initiate the packet tracing operation (and the packet capture operations). In some embodiments, the network management tool interacts with the API of the network management and control system, which executes the packet tracing operation.

To execute the packet tracing operation, the network management and control system inserts a trace packet at a first-hop managed forwarding element (MFE) for the specified source endpoint as though the packet was received by that MFE from the source endpoint. For instance, when the source endpoint is a virtual machine (VM), the first-hop MFE is an MFE operating in the virtualization software of the host machine on which that VM operates, and to which the VM directly connects (e.g., through a virtual network interface controller (VNIC)). The various MFEs that process the trace packet generate observation messages for various logical and physical network operations (e.g., distributed firewall operations, logical forwarding, physical encapsulation and forwarding operations, etc.) that they perform on the packet, and send these messages to the network management and control system.

The process 100 next generates and provides (at 110) a visualization of the logical and physical network paths between the specified endpoints. Using the observation messages, in some embodiments the network management and control system is able to determine whether the trace packet (or packets) successfully reached the destination as well as the path taken through both the logical and physical networks to reach that destination. The network management and control system provides this information to the user (e.g., via its API to the network management tool).

Figure 2:
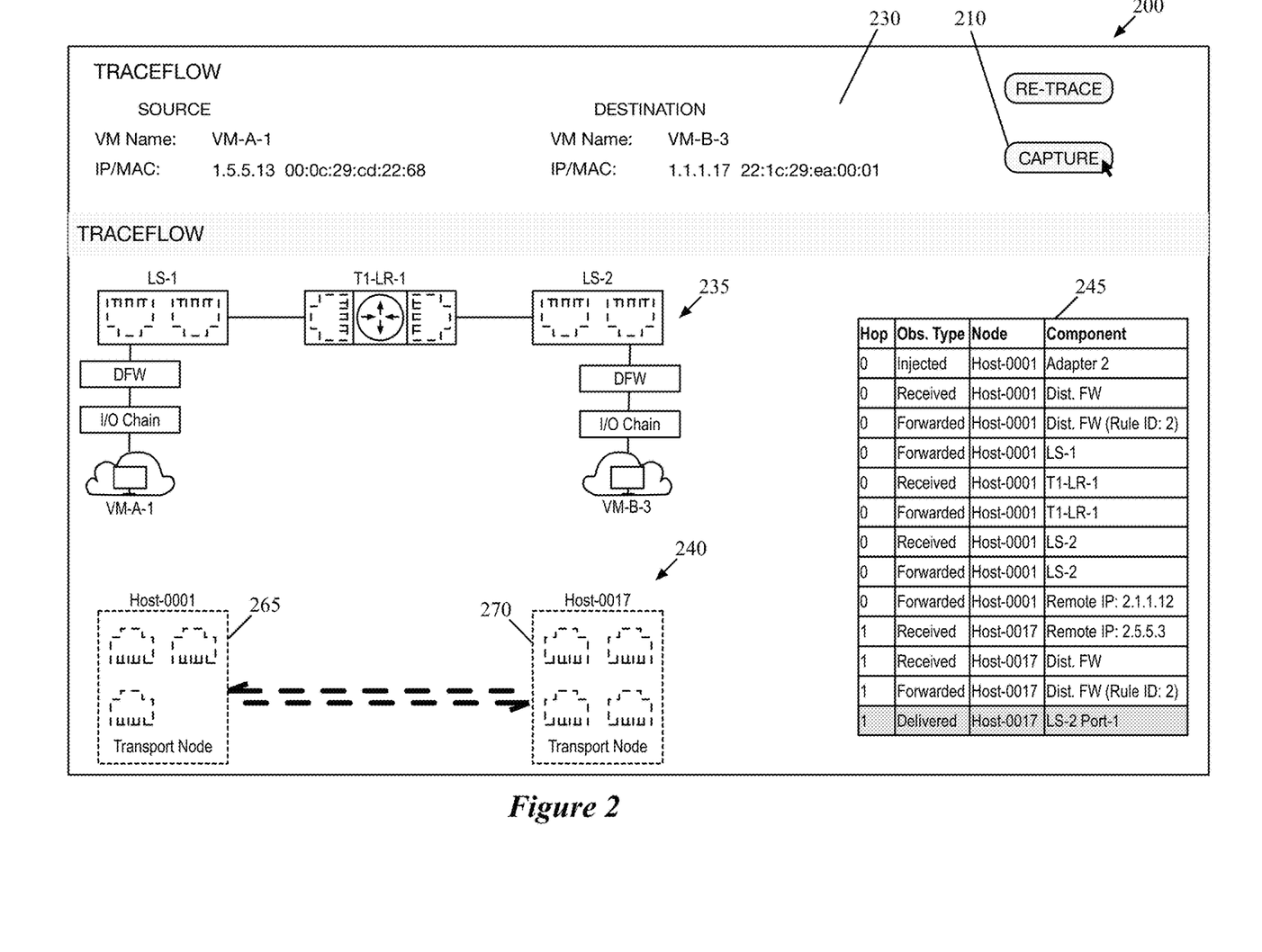
FIG. 2 illustrates an example of a packet tracing information GUI.

FIG. 2 illustrates one such example of a packet tracing information GUI 200. The GUI 200 displays the results of the packet tracing operation along with a path visualization between source and destination endpoints. The GUI 200 includes a first section 230 that identifies the source and destination information (e.g., as instructed by the user), as well as a lower section that shows logical and physical network path visualizations 235 and 240 with a table 245 of packet tracing results.

The logical path visualization 235 illustrates that in this case, the path from VM-A-1 to VM-B-3 passes through two logical switches and a logical router. In addition, some embodiments illustrate the I/O chain and distributed firewall service that is present between each VM and its respective logical switch. Other embodiments only illustrate the logical forwarding elements. The physical path visualization 240 illustrates that this logical network path is implemented by two physical components (i.e., the MFEs of the host machines on which the two endpoint VMs operate). The physical path visualization 240 shows these two machines, along with the tunnel between them. In some embodiments, the items within the path visualization are selectable in different ways for various different purposes, including to provide additional information about the components they represent, or to provide information about the trace operation. It should be understood that this figure illustrates only a subset of the possible logical and physical components possible. Various additional services (e.g., distributed load balancing) or multiple logical routers are possible on the logical path, while additional physical components (e.g., gateways implementing centralized logical routers) are possible on the physical path.

The table 245 of packet tracing results of some embodiments includes a list of observation messages received by the network management and control system from the physical components 265. In this case, the table indicates, for each message, the hop number (hops, here, referring to the physical components, rather than the logical components), the type of message (also called an observation), the physical node, and the logical component (for physical actions, other information may be provided). These visualizations 235 and 240 and the table 245 of some embodiments are described in further detail in U.S. patent application Ser. No. 15/588,727, filed May 8, 2017, now published as U.S. Pat. Publication No. 2018/0262594, which is incorporated herein by reference.

Returning to FIG. 1, the process receives (at 115) a selection of logical network points at which to perform packet capture operations. In some embodiments, the user (e.g., administrator) selects one or more of the logical network components, or points between these components, at which to execute the packet capture operations. In addition to the logical forwarding elements (e.g., logical switches, logical routers) and logical services (e.g., distributed firewalls, distributed load balancers), in some embodiments the user can select specific points such as logical ingress or egress ports of the logical forwarding elements, before or after tunnel encapsulation between physical endpoints, etc.

It should be understood that, while FIG. 1 is shown as a linear process 100, a user could also initiate the packet tracing operation and view the packet tracing information and path visualization without any subsequent packet capture. That is, the network management and control system would perform operations 105 and 110 only. The packet capture-related operations 115-140 would then either not be performed, or could be performed at a later time if the user chose to initiate packet capture.

In some embodiments, the user selects the logical packet capture points via the visualization of the logical network path generated based on the packet tracing operation. FIG. 2 illustrates a "capture" selectable button 210 in the GUI 200, over which the user has located a cursor. Upon selecting this button (or via a different interaction), the user is able to select various points in the logical network and initiate a packet capture operation.

Figure 3:
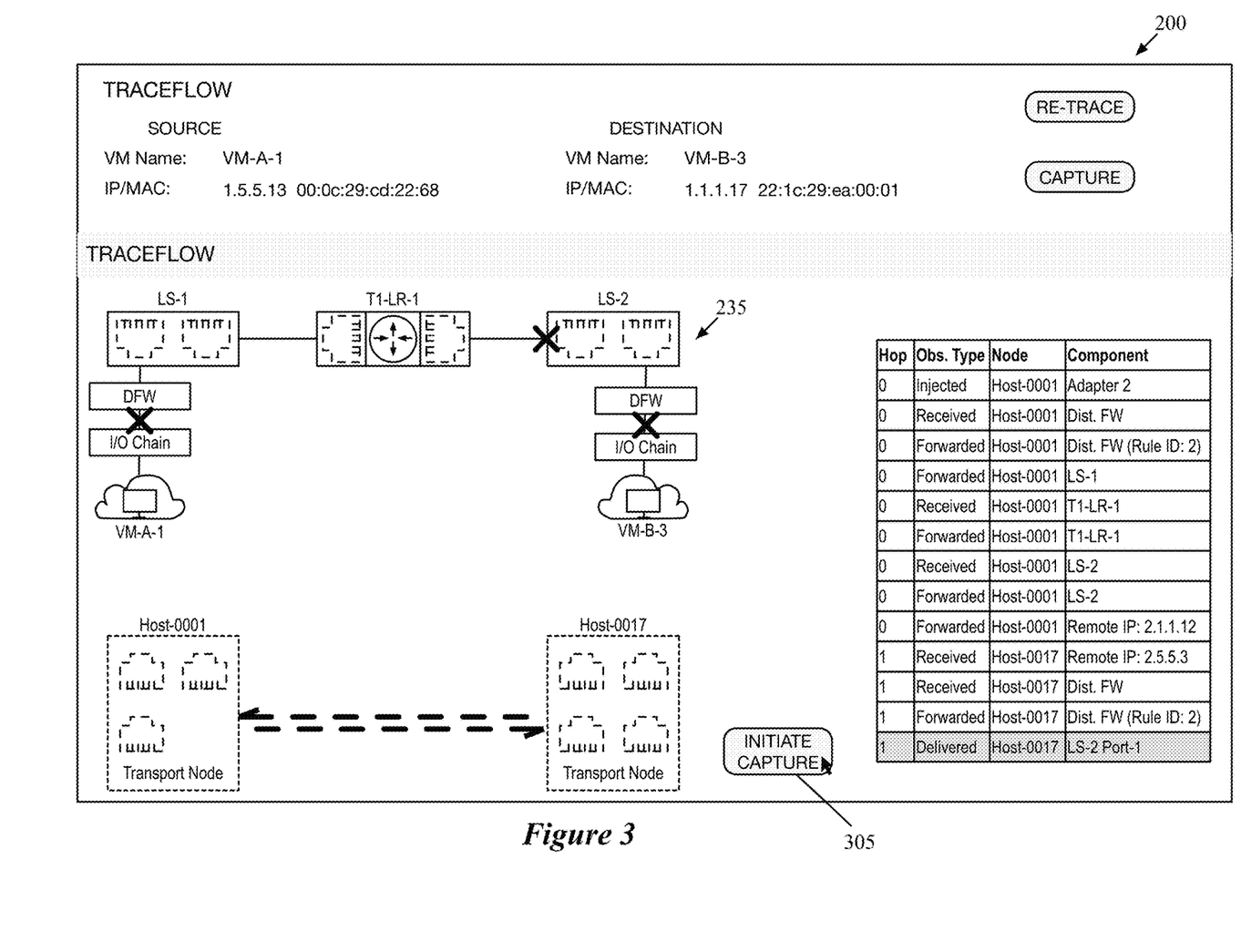
FIG. 3 illustrates an example of the selection of multiple packet capture points in the GUI of FIG. 2.

FIG. 3 illustrates an example of this selection, in the GUI 200. In this figure, the user has selected three points in the logical network path visualization 235. Specifically, the user has selected for packet tracing the location between the I/O chain and the distributed firewall service between VM-A-1 and logical switch LS-1, the location between the I/O chain and the distributed firewall between VM-B-3 and logical switch LS-2, as well as a third point on the logical switch port of logical switch LS-2 that connects to the logical router T1-LR-1. In different embodiments, different logical network points are either selectable or non-selectable, depending on whether packet capture operations can be performed at those points. For example, if a single module (e.g., a flow-based software forwarding element) implements all of the logical forwarding elements, then in some embodiments a packet capture operation cannot be performed between the logical switch and logical router. On the other hand, if a virtual switch module implements the logical switches while a virtual router module implements the logical router, then a packet capture operation can be executed as packets are passed between the two modules in some embodiments. The user also selects an "initiate capture" button 305 in order to start the packet capture process.

Next, the process 100 determines (at 120) the physical component that will execute each specified packet capture operation. In some embodiments, the physical network components identified by the network management and control system are more specific than just the host machines shown in the physical path visualization. For instance, in the example shown in FIG. 3, the first host machine (hosting VM-A-1) will execute two of the packet capture operations, while the second host machine Host-0017 (hosting VM-B-3) will execute the third packet capture operation. Two of the packet capture operations capture packets sent between the I/O chain and the distributed firewall service, and this capture operation thus executes to copy data about packets at this point in the packet path (either after a packet is sent from the I/O chain to the distributed firewall service, or vice versa). Similarly, the third packet capture inspects and copies data for packets sent between the layer 2 switching module and the layer 3 routing module.

In some embodiments, the packet capture operation between the logical router and the second logical switch is actually executed at both host machines, as this logical connection occurs at the first host machine for packets sent from VM-A-1 to VM-B-3 and at the second host machine for packets sent in the reverse direction, from VM-B-3 to VM-A-1. Other embodiments only execute the packet capture operation in the forward direction (e.g., at the first host machine). Yet other embodiments allow the user to choose the physical component at which to execute the packet capture.

The process 100 also determines (at 125) the flow-specific packet capture command for each packet capture operation. In some embodiments, the packet capture commands limit the captured packets to only those belonging to the data flow(s) between the two endpoints. This limits the number of packets captured, makes correlation between the various packet captures easier, and ensures that a logical network administrator will not be provided access to packets for other logical networks. These commands specify the parameters for identifying the flow (e.g., the source and destination IP addresses, the connection 5-tuple of source and destination IP addresses, source and destination port numbers, and transport protocol, or other sets of parameters). In addition, in some embodiments, the commands specify both directions of the data flow (e.g., reversing the source and destination parameters).

In some embodiments, the flow-specific packet capture command for different logical locations also accounts for changes in packet headers as the packet passes through different logical and/or physical components. For example, if a user selects a point after a distributed load balancer component, the packet capture command could specify all possible destination IP addresses that the load balancer could generate as flow parameters. Similarly, if a prior component will perform source NAT on the packet, the packet capture command could specify all of the possible source addresses as flow parameters (and as possible destination addresses for the reverse direction flow). If packets will be tunneled at a specified capture point, then the flow-specific packet capture command identifies the outer headers for the tunnel as the flow parameters for capture in some embodiments. Some such embodiments also specify the inner headers of the logical flow as well, to avoid capturing all traffic on the tunnel.

The process 100 then initiates (at 130) the execution of the multiple packet capture operations at the determined physical components. In some embodiments, the management plane sends messages to the central control plane indicating the need for packet captures at the particular locations, and the central controller(s) notify the respective local controllers of the host machines that need to execute the packet capture. The local controllers, in some embodiments, then initiate the packet capture operations on the appropriate interfaces within the virtualization software. In some embodiments, the management plane specifies the required parameters, while the local controller is configured to translate these parameters into an actual command (e.g., a tcp-dump execution command).

Next, the process 100 receives (at 135) the packet capture data from the executed packet capture operations. In some embodiments, each physical component (e.g., the host machine, or local controller on the host machine) performs its packet capture or multiple packet captures, and stores the captured data to a file. The local controllers then send this information to the central control plane, which aggregates the captured data for the management plane. If no packets are dropped, each packet capture operation should have data on the same number of packets, although if the data flow is ongoing, the possibility for exclusions at the edges of the capture time exists. That is, if the packet capture operations are all initiated at the same time, one of the packet captures may capture data on a packet that has already passed through one of the earlier capture points.

Finally, the process 100 correlates (at 140) data from the multiple packet capture operations and provides this correlated data (e.g., to the network management tool GUI, and thus the user). Some embodiments use the data in the packet capture to match data from different packet capture operations for the same packet, and thus present the data in a per-packet format (i.e., showing the captured data for a particular packet throughout the different packet capture locations).

Figure 4:
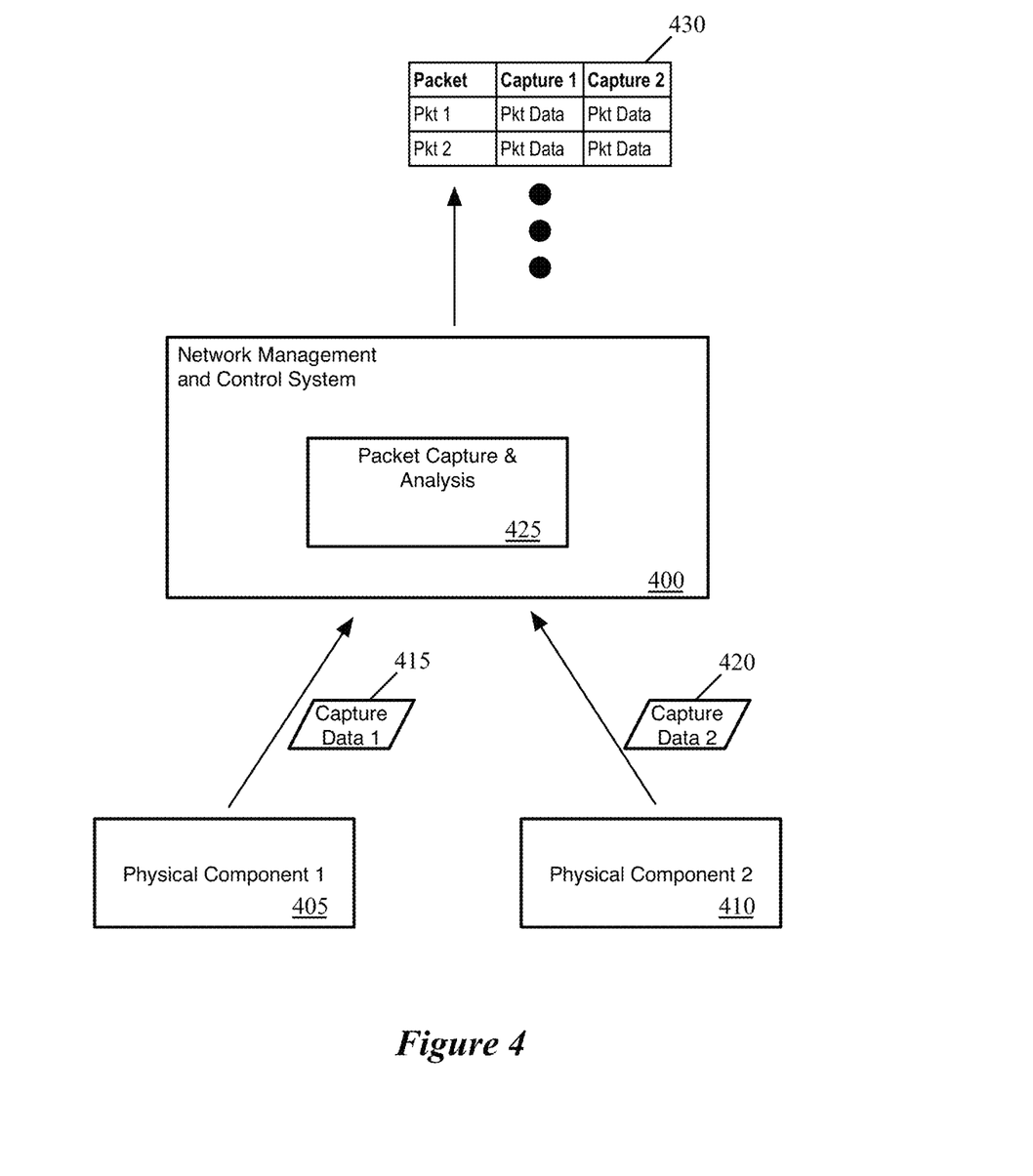
FIG. 4 conceptually illustrates packet capture data correlation by a network management and control system of some embodiments.

FIG. 4 conceptually illustrates the packet capture data correlation by a network management and control system 400 of some embodiments. As shown, two separate data captures are performed for a particular data flow at two separate physical components 405 and 410. The two physical components 405 and 410 may represent two different modules on the same physical host machine, or might be two separate host machines. These components execute data captures, the data 415 and 420 for which are provided to the network management and control system 400. In some embodiments, the local controllers on the respective host machines receive the capture data and provide this data to the management plane via the central controllers. The management plane includes a packet capture initiation and analysis module 425, in some embodiments, that correlates the multiple sets of capture data 415 and 420 into a single set of data 430. As shown, this set of data 430 is output (e.g., to the network management tool GUI) as a single set of data per packet.

Figure 5:
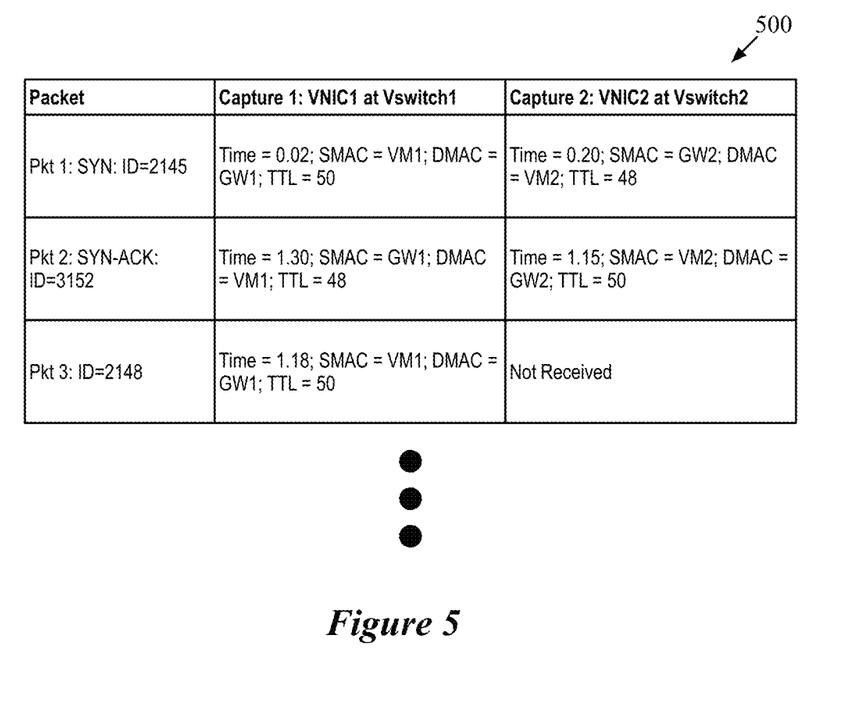
FIG. 5 conceptually illustrates in more detail an example of correlated packet capture data presented to a network management tool user.

FIG. 5 conceptually illustrates in more detail an example of correlated packet capture data 500 presented to a network management tool user. As shown, in this case two packet captures are performed, for a packet flow between VM1 and VM2 (e.g., between the IP addresses of particular interfaces of these VMs). The packet capture headers indicate that the captures are executed at the respective virtual switch interfaces to which the VNICs of the respective virtual machines connect. In some embodiments, this occurs between the virtual switch and any operations occurring in the I/O chain (e.g., various filter operations). In other operations (e.g., with a flow-based managed forwarding element), the packet capture operations would be taking place on the VM side of these services, which are performed by the MFE.

The example shows three packets, a SYN packet sent by VM 1, a SYN-ACK packet sent by VM2, and a third packet sent by VM1. Typically, the packet capture data will include timestamps for each packet captured as well as various network layer (e.g., IP) and transport layer (e.g., TCP) fields. In some embodiments, the captured data also includes data link layer (e.g., Ethernet) fields). Some embodiments use the packet header values (e.g., the packet identifier field of the IP header) to identify the same packet across the multiple sets of capture data. In this example, the packet information column shows the packet number in the capture, the type of packet in setting up the connection if relevant (e.g., SYN, SYN-ACK), and the packet identifier from the IP header. It should be noted that other header values that differ from packet to packet within a flow could also be used to synchronize packets across multiple capture points, such as TCP sequence numbers.

This enables the network management tool to provide the user with per-packet data identifying whether the packet reached each particular capture point, the time between each pair of capture points for the packet, the packet header field values at each capture point, etc. As shown, for each packet, a timestamp is given (the times are shown in this example in terms of time after initiation of the packet capture, while other embodiments display absolute times), as well as the source and destination MAC addresses and the time to live field of the IP header. Different embodiments display different header field values for the packet. In this case, the SYN packet (ID 2145) is received at the first virtual switch at time 0.02, then sent from the second virtual switch to the destination VM2 at time 0.20. The response SYN-ACK packet (ID 3152) is received at the second virtual switch at time 1.15, then sent from the first virtual switch to its destination VM1 at time 1.30. The third packet (ID 2148), on the other hand, is received at the first virtual switch at time 1.18 (before the first virtual switch has processed the SYN-ACK packet), and is not sent out by the second virtual switch (e.g., dropped by one of the virtual switches, or a physical network element). In this case, the third packet may have been dropped because the connection had not yet been established between the two VMs for the data flow.

In some embodiments, the network management and control system (or the network management tool) performs additional analysis on the captured packets. For instance, the system may calculate an average latency between the two endpoints in either or both directions, whether packets are being dropped and the frequency at which this occurs, etc.

In addition, in some embodiments, if one (or more) of the capture locations was between the tunnel endpoints of Vswitch1 and Vswitch2 (e.g., at the physical interface of either of the hosts of VM1 or VM2), then these packets would have different outer (encapsulation) headers, in addition to the internal headers that match the packets captured at the VNICs. Some embodiments present both the outer and inner headers to the user, by explicitly using packet capture commands that capture the inner headers as well as the outer headers. Similarly, if network address translation (NAT) and/or distributed load balancing is used, the presented packet capture data indicates the changes in IP addresses, transport layer ports, etc.

Figure 6:
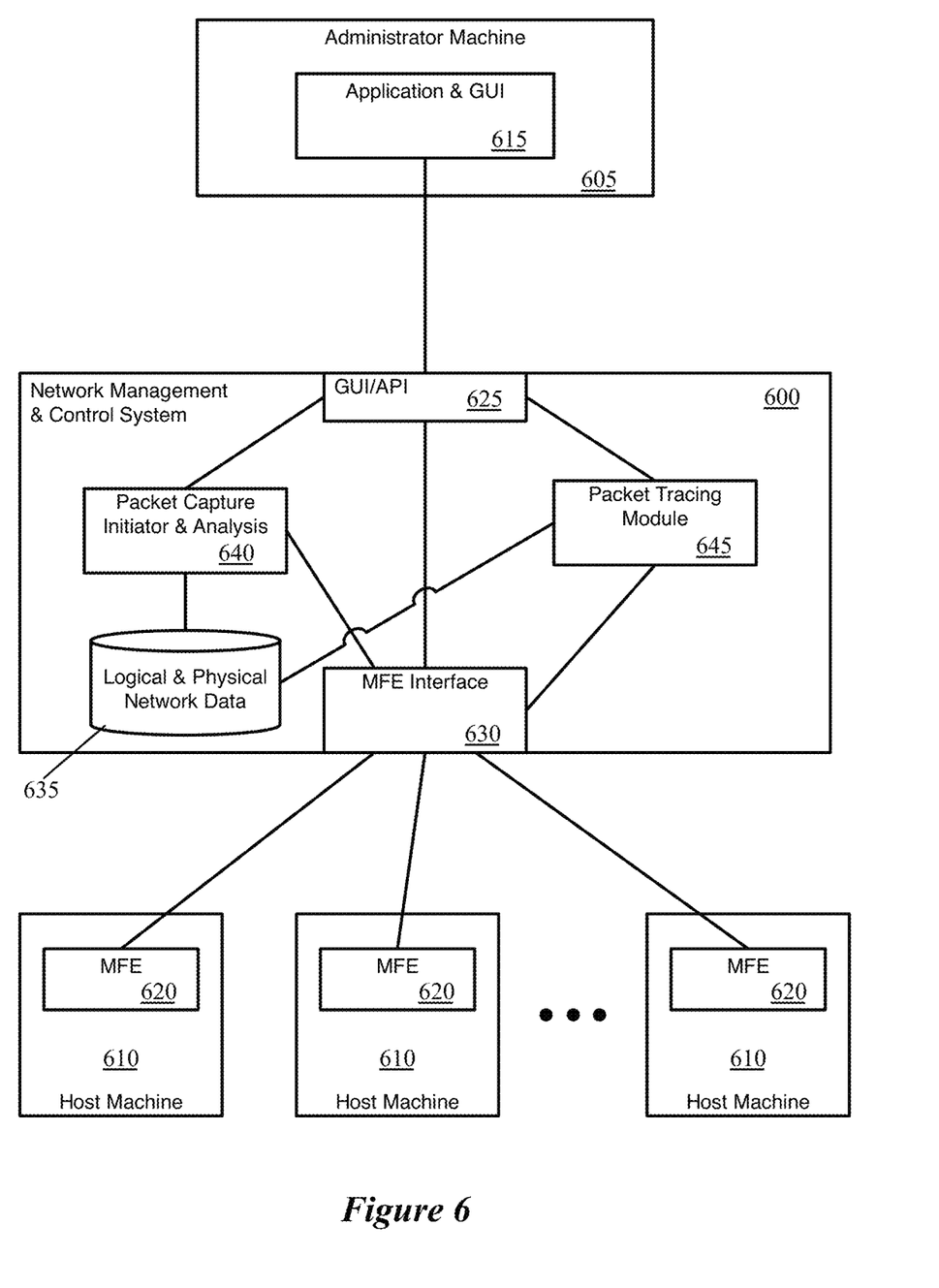
FIG. 6 conceptually illustrates the architecture of a network management and control system of some embodiments that generates and provides packet tracing and packet capture data for a network management tool.

FIG. 6 conceptually illustrates the architecture of a network management and control system 600 of some embodiments that generates and provides packet tracing and packet capture data for a network management tool. In addition, the figure illustrates and administrator machine 605 as well as several host machines 610.

The administrator machine 605, of some embodiments, may be a desktop or laptop computer, or other device, that an administrator uses to connect with the network management and control system 600. This machine 605 runs an application 615 (i.e., the network management tool) that presents the management application GUI (i.e., the GUI shown in FIGS. 2 and 3) to the administrator. This application 615 operating on the administrator machine is a management application that links with the network management and control system 600 in some embodiments. In some such embodiments, the application 615 receives data describing the packet tracing and/or packet capture operation results and uses its stored graphics and information to convert this data into the GUI. In other embodiments, the application 615 is a web browser or other generic application through which the administrator machine connects to the network management and control system 600 (e.g., as a thin client). In some such embodiments, the application 615 receives a description of the GUI itself as well as the graphics to display from the network management and control system 600 (i.e., the network management and control system generates the GUI and provides this to the application).

The host machines 610 may host logical network data compute nodes (e.g., VMs, containers, etc.) and/or centralized routing components for logical routers (e.g., as VMs, within the MFE datapath, etc.). Each of the host machines 610 includes a MFE 620. In some embodiments, the MFEs 620 are software forwarding elements (e.g., OVS, ESX) that may be part of the virtualization software of the host machine. The MFEs implement logical networks within the physical network of, e.g., a datacenter, and receive configuration data for these logical networks from the network management and control system 600. In addition, when a packet tracing operation is requested, the network management and control system 600 injects a packet into the MFE 620 on the host machine of the source endpoint for the trace. The MFEs 620 that process the trace packet send observation messages to the network management and control system 600 to indicate the actions taken on the trace packet. Similarly, when a set of packet capture operations are requested, the network management and control system 600 executes the packet captures on the host machines 610 (e.g., within the MFEs, at the interfaces to the MFEs, etc.).

The network management and control system 600, as shown, includes a GUI/API 625, an interface 630 for communicating with the MFEs, a storage 635 that stores logical and physical network data, a packet capture initiator and analysis module 640, and a packet tracing module 645. While a single block is shown to represent the network management and control system 600, it should be understood that these functions may be spread among multiple different computing devices and/or separately functioning applications on a single computing device. For instance, in some embodiments the network management and control system 600 includes a centralized management plane and centralized control plane in addition to local controllers that operate on the host machines 610 to directly control the MFEs. In addition, the centralized aspects may be performed in a distributed cluster in some embodiments.

The GUI/API 625 is the interface through which the application 615 on the administrator machine communicates with the network management and control system 600. The application 615 sends various commands (e.g., to initiate a packet tracing operation, to select packet capture locations and initiate packet capture operations, etc.) via this interface 625. The network management and control system 600 provides the GUI and/or data for the GUI to the application 615 through this interface 625.

The MFE interface 630 is representative of the interface(s) through which the network management and control system 600 configures the MFEs 620. In some embodiments, centralized controllers (operating on separate machines from the MFEs 620) provide configuration data directly to the MFEs. In other embodiments, however, the centralized network management and control system 600 provides abstract configuration data to local controllers that operate alongside the MFEs 620 on the host machines 610; these local controllers then convert this data into MFE-specific configuration data and provide the data to the MFEs. Through whichever mechanism is implemented, the network management and control system 600 injects trace packets into the appropriate source MFE 620, and receives observation messages based on the processing of this trace packet from the MFEs 620. If the MFE performs the packet capture operations, then the MFE also uses this mechanism to instruct the MFEs to execute packet capture operations. In other cases, the network management and control system executes the packet capture operations itself (e.g., on the interfaces of the MFEs).

The logical and physical network data storage 635 stores information about the configuration of various logical networks implemented within the physical networks (i.e., implemented by the MFEs 620). This includes the configuration of logical forwarding elements and their ports, distributed firewall rules, etc. In addition, the storage 635 stores information about the physical network implementation of these logical networks, including the host machines on which the various logical ports (e.g., logical network endpoints, such as VMs or other data compute nodes) are located. This information may be stored in a single central repository, replicated among multiple repositories in a cluster, and/or stored in a distributed manner.

The packet tracing module 645 receives a packet tracing request through the interface 625 and initiates the packet tracing operation. In some embodiments, various aspects of the packet tracing operation are performed by different layers of the network management and control system 600. For instance, in some embodiments the management plane initiates the process, while the local controllers actually inject the packet (according to data received from the management plane or central control plane) and receive the observation messages from the MFEs 620. The observation messages are then passed up to the centralized aspects, which analyze these messages. The packet tracing module 645 also generates the visualizations and/or table to be included in the GUI, and provides this table to the application 615 through the interface 625.

The packet capture initiator and analysis module 640 receives a set of packet capture requests through the interface 625 and initiates the packet capture operations. As mentioned, in some embodiments, the management plane receives these requests and (e.g., via the central control plane) provides the information for the capture command to the local controllers. The local controllers then execute the packet capture commands and return the data to the centralized aspects of the network management and control system. The packet capture initiator and analysis module 640 of, e.g., the management plane, also performs the data correlation (to match data from multiple captures for the same packet) and any additional analysis (e.g., latency analysis, packet drop analysis). The module 640 also formats this data and provides the formatted data to the application 615 via the interface 625 in some embodiments.

Figure 7:
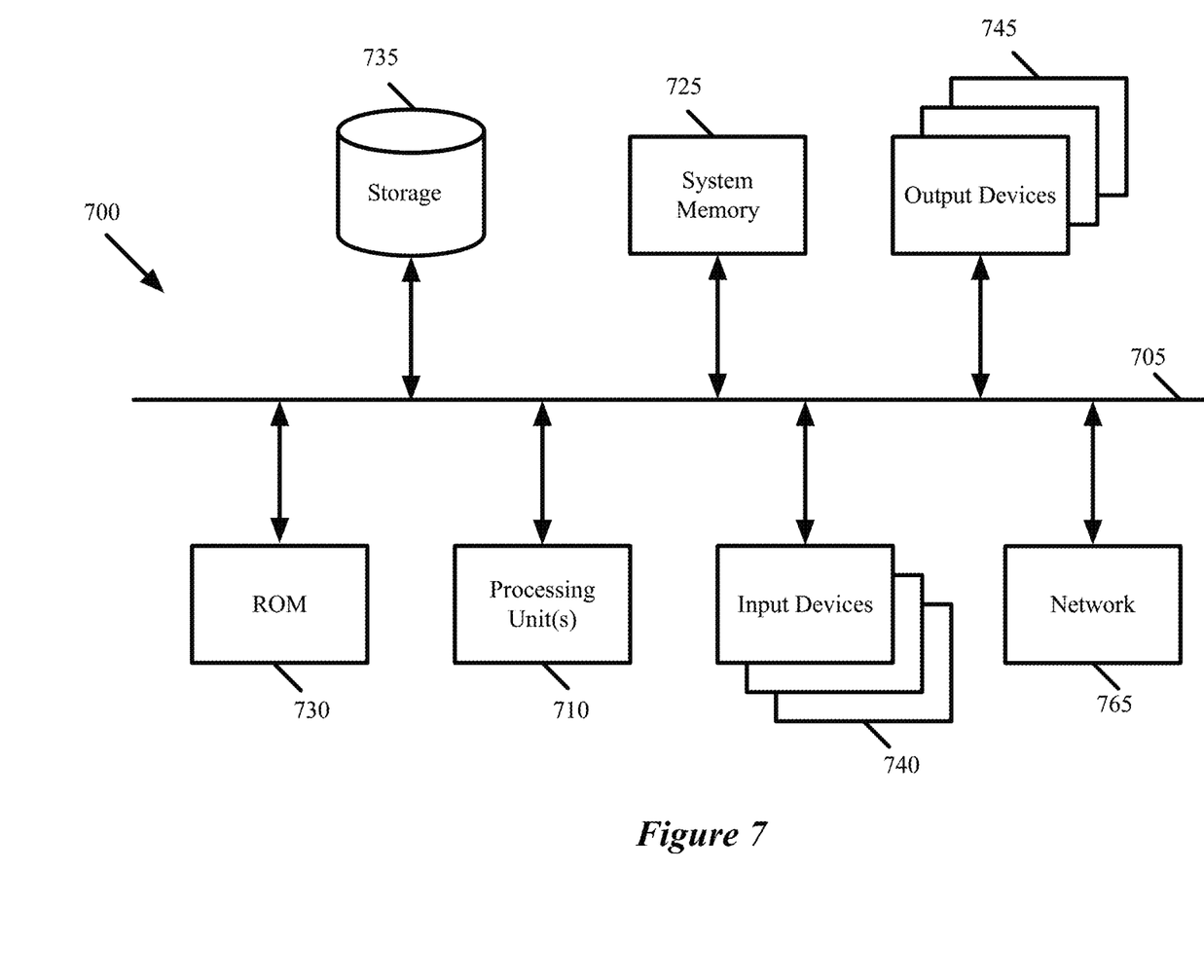
FIG. 7 conceptually illustrates an electronic system with which some embodiments of the invention are implemented.

FIG. 7 conceptually illustrates an electronic system 700 with which some embodiments of the invention are implemented. The electronic system 700 can be used to execute any of the control, virtualization, or operating system applications described above. The electronic system 700 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 700 includes a bus 705, processing unit(s) 710, a system memory 725, a read-only memory 730, a permanent storage device 735, input devices 740, and output devices 745.

The bus 705 collectively represents all system, peripheral, and chipset buses that communicatively connect the numerous internal devices of the electronic system 700. For instance, the bus 705 communicatively connects the processing unit(s) 710 with the read-only memory 730, the system memory 725, and the permanent storage device 735.

From these various memory units, the processing unit(s) 710 retrieve instructions to execute and data to process in order to execute the processes of the invention. The processing unit(s) may be a single processor or a multi-core processor in different embodiments.

The read-only-memory (ROM) 730 stores static data and instructions that are needed by the processing unit(s) 710 and other modules of the electronic system. The permanent storage device 735, on the other hand, is a read-and-write memory device. This device is a non-volatile memory unit that stores instructions and data even when the electronic system 700 is off. Some embodiments of the invention use a mass-storage device (such as a magnetic or optical disk and its corresponding disk drive) as the permanent storage device 735.

Other embodiments use a removable storage device (such as a floppy disk, flash drive, etc.) as the permanent storage device. Like the permanent storage device 735, the system memory 725 is a read-and-write memory device. However, unlike storage device 735, the system memory is a volatile read-and-write memory, such a random access memory. The system memory stores some of the instructions and data that the processor needs at runtime. In some embodiments, the invention's processes are stored in the system memory 725, the permanent storage device 735, and/or the read-only memory 730. From these various memory units, the processing unit(s) 710 retrieve instructions to execute and data to process in order to execute the processes of some embodiments.

The bus 705 also connects to the input and output devices 740 and 745. The input devices enable the user to communicate information and select commands to the electronic system. The input devices 740 include alphanumeric keyboards and pointing devices (also called "cursor control devices"). The output devices 745 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 7, bus 705 also couples electronic system 700 to a network 765 through a network adapter (not shown). In this manner, the computer can be a part of a network of computers (such as a local area network ("LAN"), a wide area network ("WAN"), or an Intranet, or a network of networks, such as the Internet. Any or all components of electronic system 700 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIG. 1) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method comprising:
performing a packet tracing operation for a particular data flow between endpoints of a logical network to generate a representation of logical network components along a path between the endpoints;
in response to receiving a selection of at least two of the logical network components from the representation of the logical network components generated based on the packet tracing operation:
identifying physical components that implement each of the selected logical network components for the particular data flow along the path between the endpoints; and
automatically generating separate packet capture operations for execution by each of the identified physical components that implement each of the logical network components selected from the representation of the logical network components generated based on the packet tracing operation; and
using packet header information to correlate packet data received from the physical components executing the separate packet capture operations.

2. The method of claim 1, wherein performing the packet tracing operation comprises:
receiving a request for the packet tracing operation from a source logical network endpoint to a destination logical network endpoint;
sending a command to generate and inject a trace packet at the source endpoint;
receiving a set of messages relating to the trace operation from the physical components that process the trace packet; and
determining the logical network components along the path between the endpoints and the physical components that implement the logical network components along the path between the endpoints.

3. The method of claim 1 further comprising, after performing the packet tracing operation, generating a visualization of the logical network components along the path and the physical components that implement the logical network components along the path.

4. The method of claim 3, wherein the visualization is displayed in a GUI and the selection of the logical network components is received through the GUI.

5. The method of claim 1, wherein the logical network components comprise at least one of a logical switch, a distributed logical routing component, a centralized logical routing component, and a distributed firewall.

6. The method of claim 1, wherein the physical components comprise at least one of a virtual network interface controller, a virtual switch, and a physical network interface controller.

7. The method of claim 1, wherein the packet capture operations specify for only packets belonging to the particular data flow to be captured.

8. The method of claim 1, wherein each packet capture operation executed by a particular physical component for a particular selected logical network component captures packet header data for all packets belonging to the particular data flow that are processed by the particular physical component as the packets traverse the particular logical network component.

9. The method of claim 8, wherein the packet header data captured for each packet belonging to the particular data flow comprises a timestamp and at least network layer header values and transport layer header values.

10. The method of claim 1, wherein using packet header information comprises:
identifying captured packet data for a particular packet from each of the separate packet capture operations; and
determining a time required for the particular packet to traverse between each logical network component for which the packet capture operations were executed.

11. The method of claim 1, wherein using packet header information comprises:
identifying captured packet data for a particular packet from a first packet capture operation;

determining that packet data was not captured for the particular packet by a second packet capture operation; and based on the packet data not being captured for the particular packet by a second packet capture operation, determining that the particular packet was dropped between the logical network component selected for the first packet capture operation and the logical network component selected for the second packet capture operation.

12. The method of claim 1, wherein using packet header information comprises using packet identifier field values of the captured packets to match data captured for a set of packets by a first packet capture operation with data captured for the set of packets by a second packet capture operation.

13. The method of claim 1 further comprising generating a graphical user interface presentation of the correlated packet data.

14. The method of claim 1, wherein a first packet capture operation for a first logical network component specifies to capture packets having a first set of values for a set of packet headers and a second packet capture operation for a second logical network component specifies to capture packets having a second set of values for the set of packet headers, based on expected modifications to packets for the particular data flow between the first and second logical network components.

15. A non-transitory machine readable medium storing a program for execution by at least one processing unit, the program comprising sets of instructions for:

performing a packet tracing operation for a particular data flow between endpoints of a logical network to generate a representation of logical network components along a path between the endpoints;

in response to receiving a selection of at least two of the logical network components from the representation of the logical network components generated based on the packet tracing operation:

identifying physical components that implement each of the selected logical network components for the particular data flow along the path between the endpoints; and automatically generating separate packet capture operations for execution by each of the identified physical components that implement each of the logical network components selected from the representation of the logical network components generated based on the packet tracing operation; and using packet header information to correlate packet data received from the physical components executing the separate packet capture operations.

16. The non-transitory machine readable medium of claim 15, wherein the set of instructions for performing the packet tracing operation comprises sets of instructions for:

receiving a request for the packet tracing operation from a source logical network endpoint to a destination logical network endpoint;

sending a command to generate and inject a trace packet at the source endpoint;

receiving a set of messages relating to the trace operation from the physical components that process the trace packet; and determining the logical network components along the path between the endpoints and the physical components that implement the logical network components along the path between the endpoints.

17. The non-transitory machine readable medium of claim 15, wherein the program further comprises a set of instructions for generating a visualization of the logical network components along the path and the physical components that implement the logical network components along the path after performing the packet tracing operation.

18. The non-transitory machine readable medium of claim 15, wherein each packet capture operation executed by a particular physical component for a particular selected logical network component captures packet header data for all packets belonging to the particular data flow that are processed by the particular physical component as the packets traverse the particular logical network component, wherein the packet header data captured for each packet belonging to the particular data flow comprises a timestamp and at least network layer header values and transport layer header values.

19. The non-transitory machine readable medium of claim 15, wherein the set of instructions for using packet header information comprises sets of instructions for:

identifying captured packet data for a particular packet from each of the separate packet capture operations; and determining a time required for the particular packet to traverse between each logical network component for which the packet capture operations were executed.

20. The non-transitory machine readable medium of claim 15, wherein the set of instructions for using packet header information comprises sets of instructions for:

identifying captured packet data for a particular packet from a first packet capture operation;

determining that packet data was not captured for the particular packet by a second packet capture operation; and based on the packet data not being captured for the particular packet by a second packet capture operation, determining that the particular packet was dropped between the logical network component selected for the first packet capture operation and the logical network component selected for the second packet capture operation.

21. The non-transitory machine readable medium of claim 15, wherein the set of instructions for using packet header information comprises a set of instructions for using packet identifier field values of the captured packets to match data captured for a set of packets by a first packet capture operation with data captured for the set of packets by a second packet capture operation.

* * * * *